F. A. CLARK.
Sled Brake.
No. 86,000.            Patented Jan'y 19, 1869.
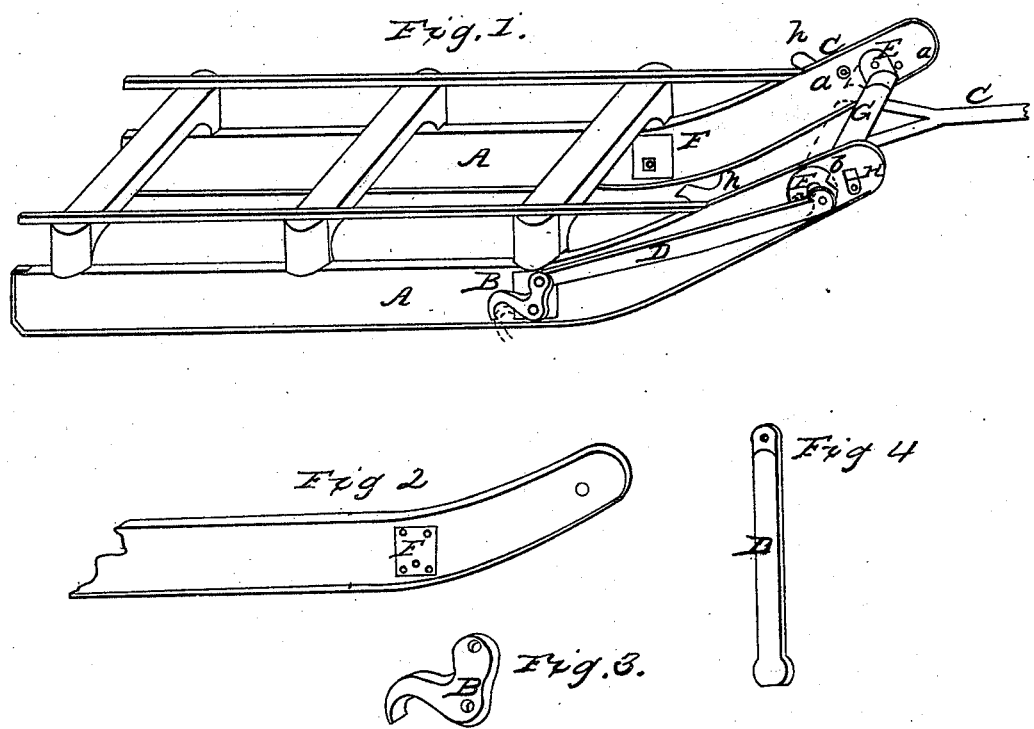
Witnesses
W. O. Collins
T. H. Kimball
Inventor,
Frank A. Clark
by his Attorney
R. M. _____

FRANK A. CLARK, OF NEW SHARON, MAINE.

Letters Patent No. 86,000, dated January 19, 1869.

IMPROVEMENT IN SLED-BRAKES.

The Schedule referred to in these Letters Patent and making part of the same.

*To all whom it may concern:*

Be it known that I, FRANK A. CLARK, of New Sharon, in the county of Franklin, and State of Maine, have invented a new and useful Improvement in Sled-Brakes; and I do hereby declare the following to be a full, clear, and exact description thereof, reference being had to the accompanying drawings, forming part of this specification, in which—

Figure 1 is a perspective view.

Figures 2, 3, and 4, are detailed views.

Similar letters of reference indicate corresponding parts in the several figures.

My invention is a novel mode of operating the brakes of sleds, and consists in certain parts, so constructed and combined as to produce a simple and practical device, as will be hereinafter more fully described.

In the drawings—

A represents the runners, which, with the other parts of the sled, are of usual construction.

B are dogs, which are pivoted to the side of the runner, and consisting of pieces of metal, formed with pointed or sharp ends, which are adapted to come in contact with ice or snow, and retard the motion of the sled.

To the upper end of each dog is pivoted a lever or arm, D, which extends forward, and is pivoted to a disk, E, secured to a crank, F.

These cranks are mounted in the nose of the runners, and the wrist-pins, at their inner sides, enter openings in the ends of the cross-bar G, to which the shafts or tongue C are connected.

Stops $a\,a$ are so arranged on the runners as to limit the play of the cranks, and consequently that of the dogs B, and thereby allow said dogs to be properly operated, either to take hold of the ice or snow, or be entirely free therefrom.

It is evident that in going down hills, or if the animals are running too rapidly, their drawing, or pulling back, or being checked, will cause the cranks to be operated so as to force the dogs against the ice or snow, and consequently check the motion of the sled, and prevent all backing.

When the brake is not needed, it is readily prevented from operating by the following provision:

I form a notch, $b$, in the disk F, and, at a proper point in the nose, I pivot a catch, H, which is intended to bear against said notch when the dog is entirely raised from the ground or ice. When the parts are in this position, the brake is entirely inoperative, but is quickly operative by throwing the catch from the notch of the disk.

The device is simple, practical, and useful.

Having thus described my invention,

What I claim as new, and desire to secure by Letters Patent, is—

In combination with the pivoted dog B, the bar N, notched eccentric disk E, cranks F, tongue C, and catches H, constructed and operating as described.

FRANK A. CLARK. [L. S.]

Witnesses:
JOSEPH MORRILL,
ELISHA SMALL.